US009791494B2

(12) United States Patent
Deumal Herraiz et al.

(10) Patent No.: US 9,791,494 B2
(45) Date of Patent: Oct. 17, 2017

(54) APPARATUS AND METHOD FOR DIAGNOSTICS OF A CAPACITIVE SENSOR

(71) Applicant: Lear Corporation, Southfield, MI (US)

(72) Inventors: Marc Deumal Herraiz, Valls (ES); Laura Castillo-Vazquez, Valls (ES); Antoni Ferre Fabregas, Valls (ES)

(73) Assignee: Lear Corporation, Southfield, MI (US)

( * ) Notice: Subject to any disclaimer, the term of this patent is extended or adjusted under 35 U.S.C. 154(b) by 576 days.

(21) Appl. No.: 13/736,303

(22) Filed: Jan. 8, 2013

(65) Prior Publication Data

US 2013/0187664 A1 Jul. 25, 2013

Related U.S. Application Data

(60) Provisional application No. 61/588,969, filed on Jan. 20, 2012.

(51) Int. Cl.
| | | |
|---|---|---|
| *G01R 31/12* | (2006.01) | |
| *G01R 31/02* | (2006.01) | |
| *G01D 18/00* | (2006.01) | |
| *G01R 31/28* | (2006.01) | |
| *G01R 1/00* | (2006.01) | |

(Continued)

(52) U.S. Cl.
CPC .......... *G01R 31/028* (2013.01); *G01D 18/00* (2013.01); *G01R 31/2829* (2013.01); *G01D 1/00* (2013.01); *G01D 5/24* (2013.01); *G01R 1/00* (2013.01); *G06F 2101/00* (2013.01)

(58) Field of Classification Search
CPC .... G01R 1/00; G01D 1/00; G06F 1/00; G06F 2101/00

USPC ........................................................ 324/548
See application file for complete search history.

(56) References Cited

U.S. PATENT DOCUMENTS

| | | | |
|---|---|---|---|
| 4,184,112 A | | 1/1980 | Cox |
| 4,523,474 A | * | 6/1985 | Browne ................ G01L 9/0072 361/283.4 |

(Continued)

FOREIGN PATENT DOCUMENTS

| | | |
|---|---|---|
| CN | 101427143 A | 5/2009 |
| CN | 201364365 Y | 12/2009 |

(Continued)

OTHER PUBLICATIONS

Chinese Office Action for corresponding Application No. 201310019571.5, mailed Jan. 22, 2015, 8 pages.

*Primary Examiner* — Jermele M Hollington
*Assistant Examiner* — Temilade Rhodes-Vivour
(74) *Attorney, Agent, or Firm* — Brooks Kushman P.C.

(57) ABSTRACT

In at least one embodiment, an apparatus for diagnosing a state of a capacitive sensor is provided. The apparatus includes a control unit for being operably coupled to a decoupling device that exhibits a drift condition and to the capacitive sensor. The control unit being configured to determine an impedance of the capacitive sensor and to determine a characteristic of the capacitive sensor based on at least the impedance. The control unit being further configured to determine a characteristic of the decoupling device based on the characteristic of the capacitive sensor and to provide an estimated capacitance based on the characteristic of the decoupling device, the estimated capacitance being indicative of the state of the capacitive sensor.

17 Claims, 4 Drawing Sheets

(51) Int. Cl.
*G01D 1/00* (2006.01)
*G01D 5/24* (2006.01)

(56) References Cited

U.S. PATENT DOCUMENTS

| | | | |
|---|---|---|---|
| 4,586,260 A * | 5/1986 | Baxter | G01B 3/205 |
| | | | 324/664 |
| 4,625,561 A * | 12/1986 | Mikkor | G01L 9/0073 |
| | | | 29/25.41 |
| 4,825,147 A | 4/1989 | Cook et al. | |
| 4,931,721 A | 6/1990 | Berrigan et al. | |
| 5,709,225 A * | 1/1998 | Budgifvars | A61N 1/36542 |
| | | | 128/899 |
| 6,307,385 B1 * | 10/2001 | Tardif | G01R 27/2605 |
| | | | 324/629 |
| 6,356,086 B1 | 3/2002 | Cook et al. | |
| 6,445,294 B1 * | 9/2002 | McDonnell | B60N 2/002 |
| | | | 180/272 |
| 7,555,929 B2 * | 7/2009 | Emmerich | G01P 21/00 |
| | | | 73/1.38 |
| 8,004,288 B1 | 8/2011 | Sherwood et al. | |
| 8,169,238 B1 * | 5/2012 | Maharyta | G01D 5/24 |
| | | | 324/658 |
| 8,179,156 B2 | 5/2012 | Horsky et al. | |
| 8,446,158 B1 * | 5/2013 | Jansson | H03K 17/9622 |
| | | | 324/601 |
| 8,576,182 B2 * | 11/2013 | Hristov | 345/173 |
| 8,629,682 B2 | 1/2014 | Garrard et al. | |
| 2006/0267599 A1 | 11/2006 | Pooranakaran et al. | |
| 2008/0079444 A1 * | 4/2008 | Denison | G01D 5/24 |
| | | | 324/679 |
| 2010/0043531 A1 | 2/2010 | Garrard et al. | |
| 2010/0079510 A1 | 4/2010 | DiBiase et al. | |
| 2011/0050620 A1 * | 3/2011 | Hristov | G06F 3/0416 |
| | | | 345/174 |
| 2012/0299602 A1 | 11/2012 | Chiu et al. | |

FOREIGN PATENT DOCUMENTS

| | | |
|---|---|---|
| CN | 101669019 A | 3/2010 |
| EP | 050665 A1 | 10/1992 |
| EP | 0704706 B1 | 6/1999 |
| FR | 2912814 A1 | 8/2008 |
| FR | 2912817 A1 | 8/2008 |
| WO | 0133245 A1 | 5/2001 |

* cited by examiner

APPARATUS AND METHOD FOR DIAGNOSTICS OF A CAPACITIVE SENSOR

CROSS-REFERENCE TO RELATED APPLICATIONS

This application claims the benefit of U.S. provisional Application No. 61/588,969 filed Jan. 20, 2012, the disclosure of which is incorporated in its entirety by reference herein.

TECHNICAL FIELD

Embodiments disclosed herein generally relate to an apparatus and method for diagnostics of a capacitive sensor.

BACKGROUND

It may be desirable to perform diagnostics on a capacitive sensor. One example, of performing diagnostics on a capacitive sensor is set forth in U.S. Publication No. 2010/0043531 (the "'531 publication") to Garrard et al.

The '531 publication provides a detector circuit for detecting the presence of a remote capacitive sensor having at least two terminals connected via a protection circuit that includes one or more capacitors. The detector circuit comprises a current supply for changing the charge on the sensor and the protection circuit and a detector for measuring the voltage on one or more of the terminals. The presence of the sensor is determined by changing the charge on the capacitive sensor and the one or more capacitors of the protection circuit in a predetermined manner such that the voltage measurement on the one or more terminals when the sensor is present is significantly different than when the sensor is absent.

SUMMARY

In at least one embodiment, an apparatus for diagnosing a state of a capacitive sensor is provided. The apparatus includes a control unit for being operably coupled to a decoupling device that exhibits a drift condition and to the capacitive sensor. The control unit being configured to determine an impedance of the capacitive sensor and to determine a characteristic of the capacitive sensor based on at least the impedance. The control unit being further configured to determine a characteristic of the decoupling device based on the characteristic of the capacitive sensor and to provide an estimated capacitance based on the characteristic of the decoupling device, the estimated capacitance being indicative of the state of the capacitive sensor.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

2

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

Various aspects noted herein generally provide for an apparatus and method to diagnose capacitive sensor(s) that are connected to a measuring circuit through a decoupling device. Various characteristics of the present disclosure may include: (i) diagnosis that is performed via digital signal processing (DSP) techniques in the frequency domain. This may introduce large flexibility, as any frequency (or combination of frequencies) in the operating range of the measuring circuit may be used, and (ii) no need to require the use of calibrating the decoupling device during life time and may ensure that an error in the diagnosis of the capacitive sensor is within a predefined range.

One aspect may be to determine a parallel resistance that a sensor (and/or element) with a capacitive behavior has in order to diagnose the leakage due to variation of such parallel resistance. Various embodiments may be used to monitor failures in systems such as, but not limited to, seat occupancy detection with capacitive sensors (e.g., automotive industry) or systems with using large decoupling capacitors (e.g., as $C_Y$ capacitors in automotive (or vehicle) high voltage (HV) systems).

Figure 1:
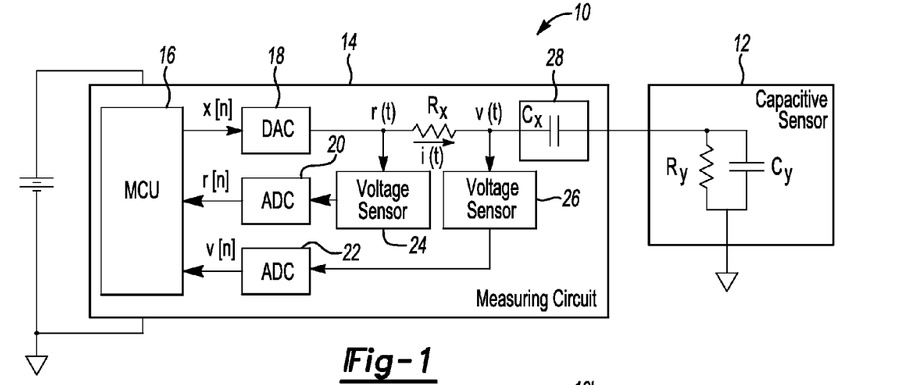
FIG. 1 depicts an apparatus for diagnosing a capacitive sensor in accordance to one embodiment.

FIG. 1 depicts an apparatus 10 for diagnosing a capacitive sensor 12 in accordance to one embodiment. The apparatus 10 includes a measuring circuit 14 for diagnosing the capacitive sensor 12. The measuring circuit 14 includes a microcontroller unit (MCU) 16 that is configured to generate a command signal in the digital domain (e.g., x[n]) and to determine an impedance of the capacitive sensor 12 by measuring signals (e.g., r[n], a reference signal) and (e.g., v[n], a voltage signal), and to apply a DSP technique for measuring the same. A digital to analog converter (DAC) 18 is configured to convert a digital version of the command signal, x[n] into a corresponding analog signal x(t). A first analog to digital converter (ADC) 20 is configured to convert the analog based signal of the reference signal (e.g. r(t)) into a corresponding digital signal of r[n]. A second ADC 22 is configured to convert the analog based signal of v(t) into a corresponding digital signal v[n].

A first voltage sensor 24 is generally configured to sense the signal of r(t) in the analog domain. In addition, a second voltage sensor 26 is generally configured to sense the signal of v(t) in the analog domain. Such signals may be sensed by the first voltage sensor 24 and the second voltage sensor 26 with a large impedance isolation to prevent error from being introduced into the measured impedance. A decoupling device 28 such as a capacitor ($C_x$) is provided to decouple the capacitive sensor 12 from measuring circuit 14. For example, the decoupling device 28 is generally arranged to prevent a transfer of energy from the measuring circuit 14 to the capacitive device 12. The decoupling device 28 of FIG. 1 is generally arranged as a half decoupling circuit where a common ground is used between the capacitive sensor 12 and the measuring circuit 14.

Figure 2:
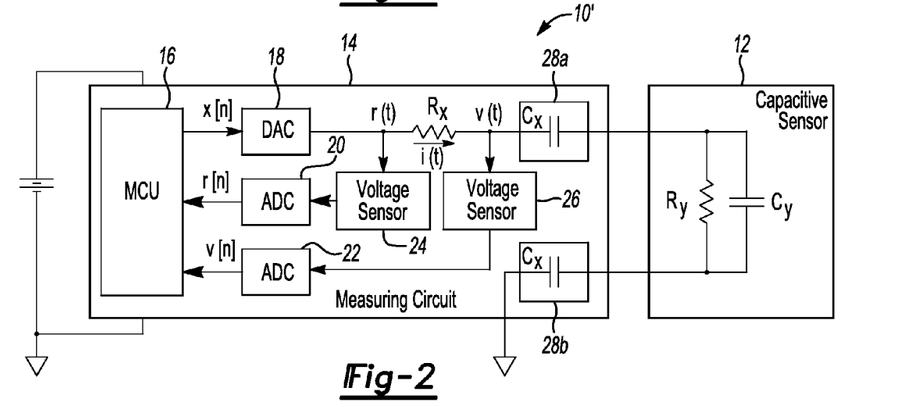
FIG. 2 depicts an apparatus for diagnosing a capacitive sensor in accordance to one embodiment.

FIG. 2 generally depicts an apparatus 10' that is similar to the apparatus 10 of FIG. 1. However, the apparatus 10' provides a decoupling device 28a-28b ("28") in the form of a full decoupling circuit in which the capacitive sensor 12 is totally isolated from the measuring circuit 14. In general, it is contemplated that the decoupling device 28 may not need calibration during its lifetime. It is also recognized that an error in the diagnosis of the capacitive sensor 12 is generally within a predefined range. The capacitive sensor 12 is generally modeled as a resistance that is in parallel with a capacitor $C_x$.

The apparatus 10 and 10' may be configured to perform the following: (i) measure an overall impedance of the capacitive sensor 12 in addition to the decoupling device 28 and (ii) determine a value of $R_y$ and $C_y$ of the capacitive sensor 12 within a predefined error without the need to calibrate the decoupling device 28. In general, the value of $R_y$ and $C_y$ are calculated by the MCU 16 by applying Ohm's law based on the signals x[n], y[n], and v[n].

Figure 3:
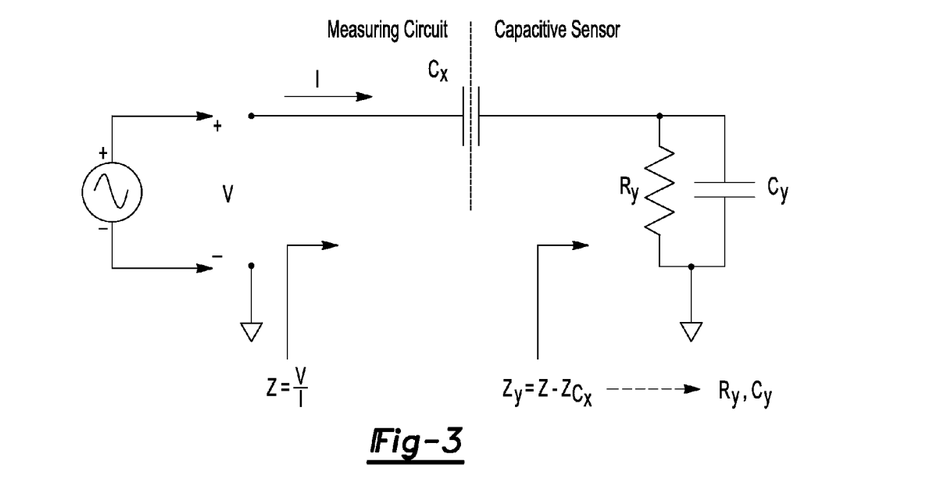
FIG. 3 depicts a block diagram implementation representing the apparatus of FIG. 1.

FIG. 3 depicts a block diagram implementation representing the apparatus 10 of FIG. 1. To measure the overall impedance, the apparatus 10 generates the signal (e.g., x[n]) that is made up of one or several subcarriers, at desired frequencies and performs a frequency domain analysis of the voltage and current signals (e.g., v(t) and r(t), respectively) before the decoupling device 28. In other words, the measured overall impedance is calculated using the values of voltage (e.g., V as shown in FIG. 3) and current (e.g., I as shown in FIG. 3) as shown to the left of $C_y$ (e.g., the decoupling circuit 28).

In general, the notion of generating a multicarrier signal is to determine the overall impedance at different frequencies so that the apparatus 10, 10' may determine which are the most appropriate frequencies to be used in order to determine the value of the elements $R_y$ and $C_y$. This may include (i) discarding those frequencies where interference is present (e.g., for instance, in case an AC power signal is present, the apparatus 10, 10' may detect that an interference at 50 Hz (or 60 Hz) is present and automatically discard this frequency) and/or (ii) discarding frequencies where undesired circuit responses may introduce large errors in the measurements may occur.

The generated signal of x(t) comprises N orthogonal subcarriers, as follows:

$$x(t) = \sum_{k=-N/2}^{N/2-1} X_k \cdot e^{j2\pi f_k t},$$

$$0 \leq t < T_S,$$

where $X_k$ is the amplitude of the subcarrier at frequency $f_k = k/T_S$ and $T_S$ is the duration of the signal. The amplitude of each subcarrier may allow (i) $X_k$ to take the value of 0 if the subcarrier is not used and $\{-1,1\}$ if the subcarrier is used, or (ii) for the signal x(t) to be a real-value, the subcarrier amplitudes should be symmetric: $X_k = X_{-k}^*$, (e.g., Hermitian symmetric) where the asterisk denotes a complex conjugate.

Since the signal x[n] is generated by the MCU 16, a discrete (digital) formulation may be used instead of the continuous (analog) one as provided directly above. For example, x[n] may be used to denote the time domain signal x(t) in the digital domain and $X_k$ may be used to denote the frequency domain signal in the digital domain. It can be shown that x[n] can be obtained by taking the $N/N_s$-scaled inverse discrete Fourier Transform (IDFT) of the vector constituted by $\{X_k\}:[X_0, X_1, \ldots, X_{N-1}]$:

$$x[n] = \frac{1}{N_2} \sum_{k=0}^{N-1} X_k e^{\frac{j2\pi kn}{N}},$$

$$n = 0, 1, \ldots, N-1,$$

where $N_s$ is the number of active subcarriers (e.g., with an amplitude different than zero) and N is the IDFT size.

To potentially avoid an initial transitory state and, hence, to ensure that the impedance is computed in the steady-state, a cyclic prefix of length $N_{cp}$ is added at the beginning of the signal. This may be completed by simply copying the last samples of the generated time domain signal to the beginning. The length of the cyclic prefix, $N_{cp}$, shall be chosen so that $N_{cp} \cdot T_s$ is larger than the initial transitory.

To measure the overall impedance of the capacitive sensor 12, the apparatus 10, 10' may need to (i) obtain the corresponding voltage and current signals at the input of the decoupling device 28, (ii) discard the first $N_{cp}$ samples, (iii) transform the remaining signals to the frequency domain (e.g., v[n] and r[n]), and (iii) determine the impedance of the capacitive sensor 12 at the given frequencies by dividing the corresponding voltage and current values. For example, let us define r[n], n∈[0, N−1] and v[n], n∈[0, N−1] as the reference signal (e.g., from the output of the DAC 18) and the voltage signal (e.g., at the input of the decoupling device 28), respectively, within the DFT window (see FIGS. 1 and 2). The impedance of the capacitive sensor 12 may be computed as follows:

1. Determine the input current as i[n]=(r[n]−v[n])/$R_x$
2. Convert the voltage signal to the frequency domain by way of the $N_s$/N-scaled DFT:

$$V[k] = \frac{N_s}{N} \sum_{n=0}^{N-1} v[n] \cdot e^{-j2\pi kn/N},$$

$$k \in Q$$

where Q is a set of subcarrier indices with an amplitude that is different than zero and with values in the range [0, N/2].

3. Convert the current signal to the frequency domain by way of the $N_s/N$-scaled DFT:

$$I[k] = \frac{N_s}{N}\sum_{n=0}^{N-1} i[n] \cdot e^{-j2\pi kn/N},$$

$$k \in Q$$

4. Determine an overall impedance for the capacitive sensor 12 at subcarrier k as:

$$Z[k] = \frac{V[k]}{I[k]},$$

$$k \in Q$$

It is recognized that co-pending U.S. application Ser. No. 13/286,174 ("the '174 application") filed on Oct. 31, 2011 also discloses at least one implementation for determining the impedance. The implementation as set forth in the '174 application is hereby incorporated by reference in its entirety.

Generally, the number of subcarriers may be smaller than the DFT size. Hence, to reduce the computational complexity, it may not be necessary to take the whole DFT (or FFT). Rather, the complex amplitude may be computed at the desired subcarriers. Moreover, since the discrete time domain signals r[n] and v[n] are real, it follows that the frequency domain signals are Hermitian symmetric. Hence it is sufficient to compute the complex amplitudes of the subcarriers with an index in the range [0, N/2]. Taking this into account, the apparatus 10, 10' may determine the overall impedance of the capacitive sensor 12 as follows:

1. Determine the input current as $i[n]=(r[n]-v[n])/R_x$
2. Determine a complex amplitude of the voltage signal at the $N_s$ frequency components by projecting it into each DFT coefficient vector $w^{q_k}$:

$$V[q_k] = \sum_{n=0}^{N-1} v[n] \cdot w^{q_k}[n],$$

$$k = [1, 2, \ldots, N_s]$$

where $$w^{q_k} = [w^{q_k}[0], w^{q_k}[1], \ldots, w^{q_k}[N-1]]$$

and $$w^{q_k}[n] = \frac{N_s}{N} e^{-j2\pi q_k n/N}.$$

3. Determine a complex amplitude of the current signal at the $N_s$ frequency components by projecting it into each DFT coefficient vector $w^{q_k}$:

$$I[q_k] = \sum_{n=0}^{N-1} i[n] \cdot w^{q_k}[n],$$

$$k = [1, 2, \ldots, N_s]$$

4. Determine an overall impedance at the $N_s$ frequency components as:

$$Z[q_k] = \frac{V[q_k]}{I[q_k]},$$

$$k = [1, 2, \ldots, N_s]$$

Alternatively, following the linearity property of the Fourier transform, the apparatus 10, 10' may determine the impedance as:

$$Z[q_k] = \frac{V[q_k] \cdot R_x}{R[q_k] - V[q_k]}, \quad \text{(Eq. A)}$$

$$k = [1, 2, \ldots, N_s]$$

which may result in a reduced computational complexity. The term $R[q_k]$ is the complex amplitude of the reference signal at the $N_s$ frequency components that is calculated by projecting it into each DFT coefficient vector $w^{q_k}$.

In general, the decoupling device 28a (e.g., capacitor $C_x$) may exhibit some form of drift overtime due to aging or the environment. Such a drift may affect the ability of the apparatus 10, 10' to measure the impedance of the capacitive sensor 12 and thereby affect the manner in which the capacitive sensor 12 is diagnosed. The present disclosure as set forth below may compensate for such drift at the decoupling device 28. For example, assume that the value of the decoupling capacitor $C_x$ is known. In such a case, to determine $R_y$ and $C_y$ for the measuring circuit 12 and the capacitive sensor 12 in a half decoupled implementation as set forth in FIG. 1, the determination may include solving two equations with two unknowns:

$$Z - Z_{C_x} = (R_y^{-1} + Z_{C_y}^{-1})^{-1},$$

where $Z_{C_x} = 1/jwC_x$ and $Z_{C_y} = 1/jwC_y$ are the impedances of $C_x$ and $C_y$, respectively. This results in:

$$R_y = \frac{|Z|^2}{\Re\{Z\}} + \frac{1 + 2 \cdot w \cdot C_x \cdot \Im\{Z\}}{\Re\{Z\} \cdot w^2 \cdot C_x^2}$$

$$C_y = \frac{\Im\{Z\} + \frac{1}{w \cdot C_x}}{w \cdot |Z|^2 + \frac{1}{w \cdot C_x^2} + \frac{2 \cdot \Im\{Z\}}{C_x}},$$

where $\Re\{\cdot\}$ and $\Im\{\cdot\}$ denote real and imaginary portions, respectively. For the fully decoupled capacitive sensors the equations become:

$$Z - 2 \cdot Z_{C_x} = (R_y^{-1} + Z_{C_y}^{-1})^{-1}$$

which results:

$$R_y = \frac{|Z|^2}{\Re\{Z\}} + \frac{4 + 4 \cdot w \cdot C_x \cdot \Im\{Z\}}{\Re\{Z\} \cdot w^2 \cdot C_x^2}$$

$$C_y = \frac{\Im\{Z\} + \frac{2}{w \cdot C_x}}{w \cdot |Z|^2 + \frac{4}{w \cdot C_x^2} + \frac{4 \cdot \Im\{Z\}}{C_x}}$$

Figure 4:
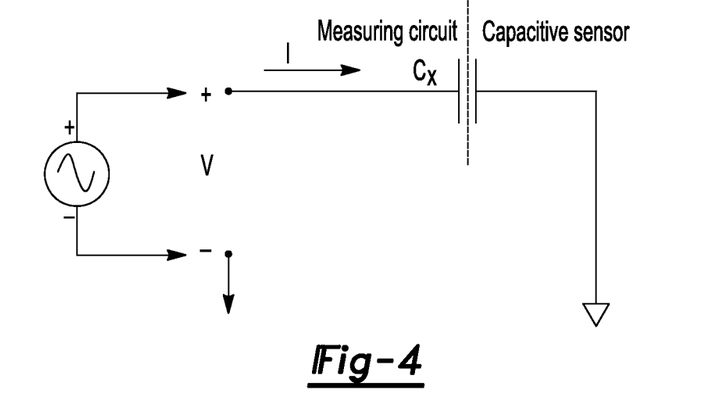
FIG. 4 depicts an apparatus for calibrating a value of a capacitance in accordance to one embodiment.

In practice, due to tolerances, aging, temperature drift, etc. the actual value of the capacitor $C_x$ may not be known with a sufficient accuracy. This introduces large errors in the estimation of $R_y$ and $C_y$ for the purpose of diagnosing the capacitive sensor 12. As depicted in FIG. 4, such an implementation includes calibrating the value of $C_x$ before measuring $R_y$ and $C_y$. However, this implementation may be expensive as extra hardware may be needed. It is recognized that the implementation in FIG. 4 may not be implemented in some cases.

As noted above, various aspects of the present disclosure may determine $R_y$ and $C_y$ from the overall impedance Z without requiring explicit calibration while ensuring that the error in the diagnosis of the capacitive sensor 12 is within a predefined range. The mathematical background for the present disclosure may be based on the measuring circuit 14 and the capacitive sensor 12 being implemented in a half decoupled arrangement. It is recognized that the disclosure as provided herein may also be extended to apply to the full-decoupled arrangement.

The apparatus 10, 10' (e.g., the MCU 16) performs a first computation for a lower bound for $R_y$ and then determines $C_y$. This may be suitable for applications where the estimation of $R_y$ shall be given within a negative relative error range. That is, the estimated $R_y$ should be smaller than the actual value or $R_y$ but with a predefined accuracy.

Figure 5A:
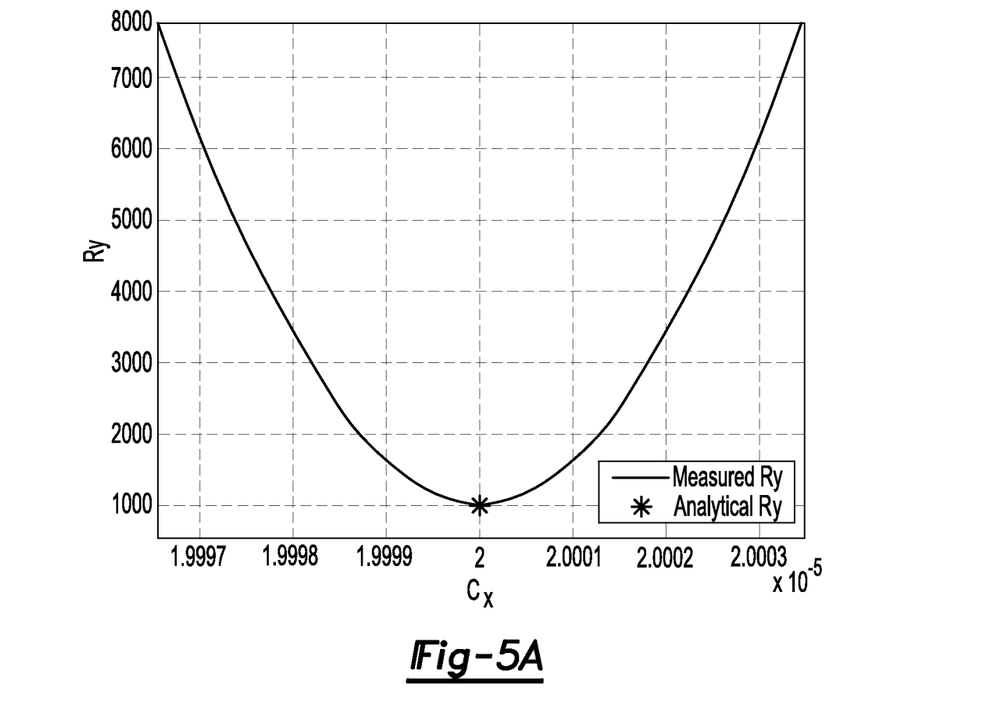
FIGS. 5A-5B each depict a value of resistance as a function of capacitance in accordance to one embodiment.
Figure 5B:
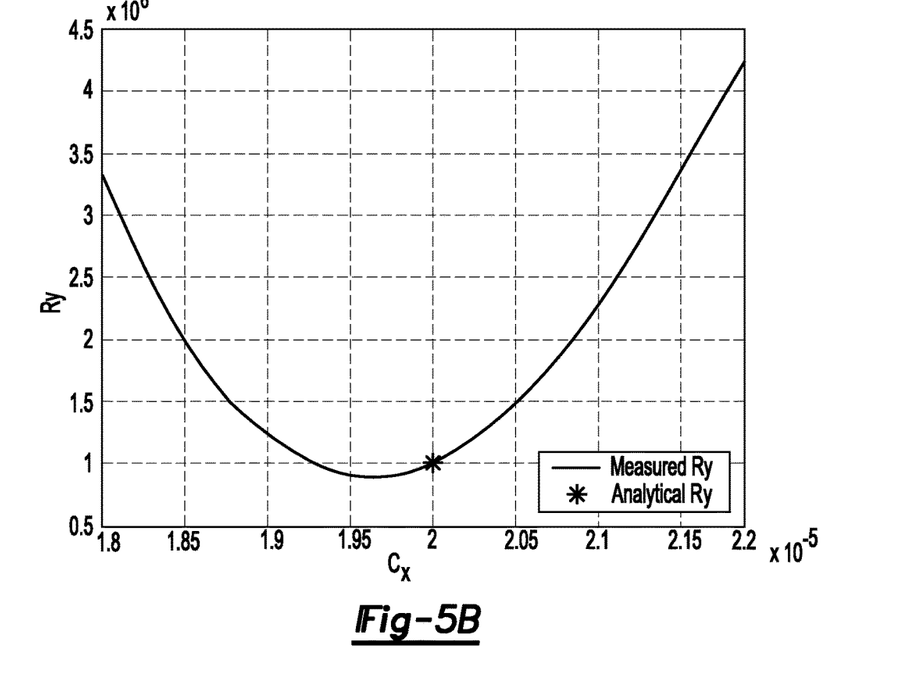

The implementation as provided herein may be based on the fact that, provided a sufficiently small frequency is used, the expression $$R_y = f(C_x) = \frac{|Z|^2}{\Re\{Z\}} + \frac{1 + 2 \cdot w \cdot C_x \cdot \Im\{Z\}}{\Re\{Z\} \cdot w^2 \cdot C_x^2} \quad \text{(Eq. B)}$$

for a given z and w is minimum at the actual value of $C_x$ and this minimum value $R_y^{(min)} = \min\{f(C_x)\}$ is the actual value of (or at least a lower bound with a predefined accuracy). In case the frequency is not small enough, then the minimum of the expression is not anymore in the exact actual value of $R_y$ but the error can be predefined. FIGS. 5a-5b depict the value of $R_y = f(C_x)$. As can be observed in FIG. 5a, the minimum of the expression (e.g., $R_y = f(C_x)$) coincides with the actual (analytical) value of $R_y$ while in FIG. 5b, the value of $R_y = f(C_x)$ is generally smaller since the frequency used is not small enough.

Figure 6:
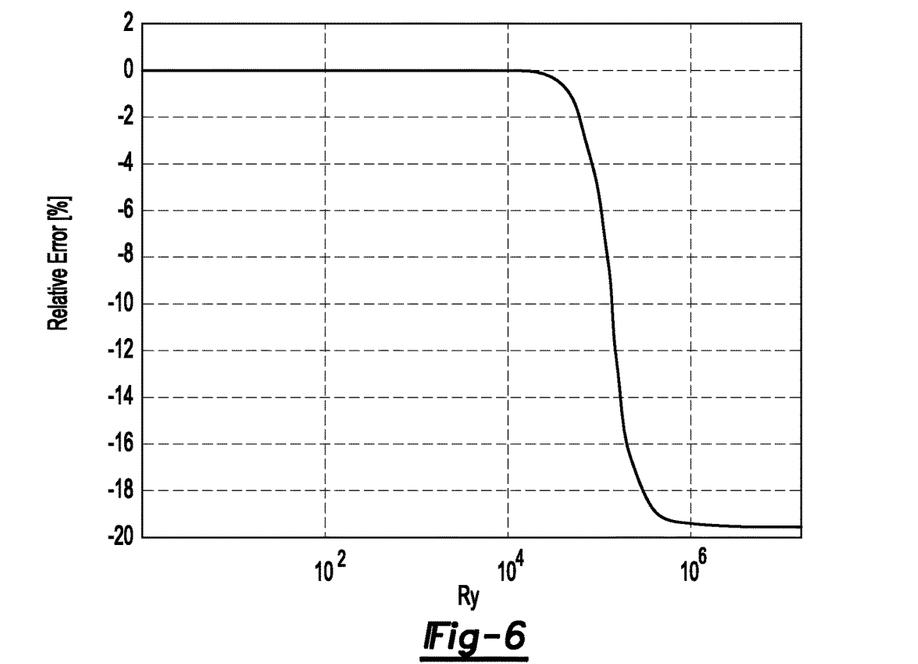
FIG. 6 depicts a relative error of resistance for various values in a range.

FIG. 6 depicts the relative error in the estimation of $R_y$ as a function of the actual value. As it can be observed for low values of $R_y$, the error is negligible and for large values, the error is limited to a given value (e.g., −19%).

Figure 7:
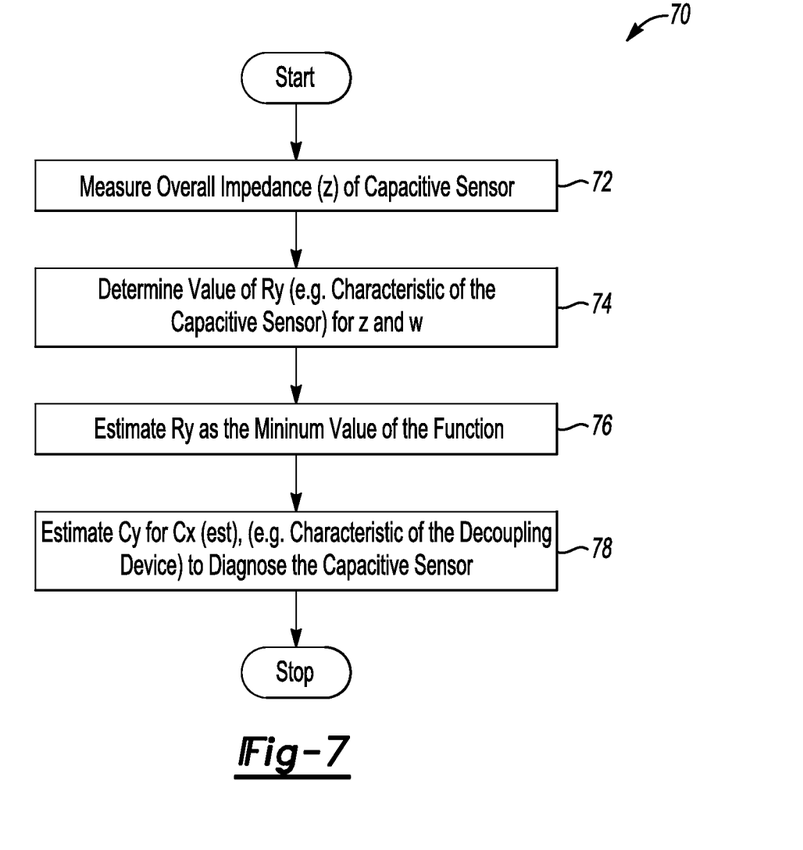
FIG. 7 depicts a method for performing diagnostics of the capacitive sensor, which compensates for drift at a decoupling device.

FIG. 7 depicts a method 70 for performing diagnostics of the capacitive sensor 12 which compensates for drift at the decoupling device 28.

In operation 72, the MCU 16 (or the measuring circuit 14) determines the overall impedance (Z) of the capacitive sensor 12 and the decoupling device 28 (e.g., as noted in connection with FIGS. 1 and 2) via Eq. A as set forth above.

In operation 74, the MCU 16 determines the value of $R_y$ (e.g., a characteristic of the capacitive sensor 12) for Z and w, assuming different values of $C_x$ around the nominal value (or actual value of $C_x$):

$$R_y = f(C_x), \, C_x \in [1-\Delta, 1+\Delta] \cdot C_z^{(nom)}$$

where $\Delta$ shall be chosen to be larger than the maximum variation around the nominal caused by tolerances, aging, temperature drift, etc. to $C_x$ (or to the decoupling device 28) (see Eq. B). Alternatively, an initial calibration of $C_x$ at the end-of-line may be performed to reduce the estimation range ($\Delta$). Note, that in such case it may not be necessary that $\Delta$ fully considers the variation caused by the tolerance.

In operation 76, the MCU 16 determines or estimates a minimum value of $R_y$ as the minimum value of $f(\bullet)$ and $C_x$ as the argument that minimizes the function $f(\bullet)$:

$$R_y^{(est)} = \min\{f(C_x)\}$$

$$C_x^{(est)} = \arg\min\{f(C_x)\}$$

In other words, the MCU 16 determines the minimum value of $R_y$ (or the minimum value of Eq. B as set forth above) to establish $R_y^{(est)}$. In addition, the MCU 16 determines the complex portion (or imaginary portion) of $\min\{f(C_x)\}$ to provide an estimated value of $C_x$ or $C_x^{(est)}$ (or a characteristic of the decoupling circuit 28). In general, the determination of the minimum value of $R_y$ and the $C_x^{(est)}$ may compensate for the drift exhibited at the decoupling device 28.

In operation 78, the MCU 16 estimates $C_y$ based on $C_x^{(est)}$, the overall impedance (Z), and w to perform diagnostics on the capacitive sensor 12 with the following:

$$C_y^{(est)} = g(C_x) = \frac{\Im\{Z\} + \frac{1}{w \cdot C_x}}{w \cdot |Z|^2 + \frac{1}{w \cdot C_x^2} + \frac{2 \cdot \Im\{Z\}}{C_x}}$$

The MCU 16 compares $C_y^{(est)}$ against a predetermined value to determine if the capacitive sensor 12 is experiencing a fault. If $C_y^{(est)}$ exceeds the predetermined value, then the MCU 78 determines that the capacitive sensor 12 is faulty and electronically transmits a notification to notify a user of the fault condition. If not, then the MCU 16 determines that the capacitive sensor 12 is working properly.

It is recognized that the method 70 may be performed periodically while the apparatus 10, 10' or on demand while in a vehicle or other device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for diagnosing a state of a capacitive sensor, the apparatus comprising:
a control unit for being operably coupled to a capacitor that exhibits a drift condition and to the capacitive sensor, the control unit being configured to:
determine an impedance of the capacitive sensor;
determine a resistance of the capacitive sensor based on at least the impedance;
determine a characteristic of the capacitor based on the resistance of the capacitive sensor; and
provide an estimated capacitance based on the characteristic of the capacitor, the estimated capacitance being indicative of the capacitive sensor exhibiting a fault condition.

2. The apparatus of claim 1 wherein the resistance of the capacitive sensor corresponds to a minimum resistance value of the capacitive sensor.

3. The apparatus of claim 1 wherein the characteristic of the capacitor corresponds to a capacitance of the capacitor.

4. The apparatus of claim 1 wherein the characteristic of the capacitive sensor and the characteristic of the capacitor compensate for the drift condition exhibited at the capacitor.

5. The apparatus of claim 1 wherein the control unit is further configured to compare the estimated capacitance to a predetermined capacitance value to diagnose the capacitive sensor.

6. The apparatus of claim 5 wherein the control unit is further configured to determine that the capacitive sensor exhibits the fault condition in response to the estimated capacitive exceeding the predetermined capacitance value.

7. A method for diagnosing a state of a capacitive sensor, the method comprising:
  determining an impedance of the capacitive sensor;
  determining a resistance of the capacitive sensor based on at least the impedance;
  determining a characteristic of a capacitor that exhibits a drift condition based on the resistance of the capacitive sensor; and
  providing an estimated capacitance based on the characteristic of the capacitor, the estimated capacitance being of the capacitive sensor exhibiting a fault condition.

8. The method of claim 7 wherein the resistance of the capacitive sensor corresponds to a minimum resistance value of the capacitive sensor.

9. The method of claim 7 wherein the characteristic of the capacitor corresponds to a capacitance of the capacitor.

10. The method of claim 7 further comprising compensating for the drift condition exhibited at the capacitor with the resistance of the capacitive sensor and the characteristic of the capacitor.

11. The method of claim 7 further comprising comparing the estimated capacitance to a predetermined capacitance value to diagnose the capacitive sensor.

12. The method of claim 11 further comprising determining that the capacitive sensor exhibits the fault condition in response to the estimated capacitive exceeding the predetermined capacitance value.

13. An apparatus for diagnosing a state of a capacitive sensor, the apparatus comprising:
  a control unit for being operably coupled to a capacitor and the capacitive sensor, the capacitor exhibiting a drift condition and being configured to prevent a transfer of energy to the capacitive sensor, the control unit being configured to:
    determine an impedance of the capacitive sensor;
    determine a resistance of the capacitive sensor based on at least the impedance;
    determine a characteristic of the capacitor based on the resistance of the capacitive sensor; and
    provide an estimated capacitance based on the characteristic of the capacitor, the estimated capacitance being indicative of the capacitive sensor exhibiting a fault condition.

14. The apparatus of claim 13 wherein the resistance of the capacitive sensor corresponds to a minimum resistance value of the capacitive sensor.

15. The apparatus of claim 13 wherein the characteristic of the capacitor corresponds to a capacitance of the capacitor.

16. The apparatus of claim 13 wherein the characteristic of the capacitive sensor and the characteristic of the capacitor compensate for the drift condition exhibited at the capacitor.

17. The apparatus of claim 13 wherein the control unit is further configured to compare the estimated capacitance to a predetermined capacitance value to diagnose the capacitive sensor.

* * * * *

UNITED STATES PATENT AND TRADEMARK OFFICE
CERTIFICATE OF CORRECTION

PATENT NO. : 9,791,494 B2
APPLICATION NO. : 13/736303
DATED : October 17, 2017
INVENTOR(S) : Marc Deumal Herraiz et al.

Page 1 of 1

It is certified that error appears in the above-identified patent and that said Letters Patent is hereby corrected as shown below:

In the Claims

Column 9, Line 11, Claim 6:
Before "exceeding the predetermined capacitance"
Delete "capacitive" and
Insert -- capacitance --.

Column 10, Line 3, Claim 12:
Before "exceeding the predetermined capacitance"
Delete "capacitive" and
Insert -- capacitance --.

Signed and Sealed this
First Day of May, 2018

Andrei Iancu
*Director of the United States Patent and Trademark Office*